H. G. Thompson,
Turning Regular Forms.
Nº 7,311. Patented Apr. 23, 1850.
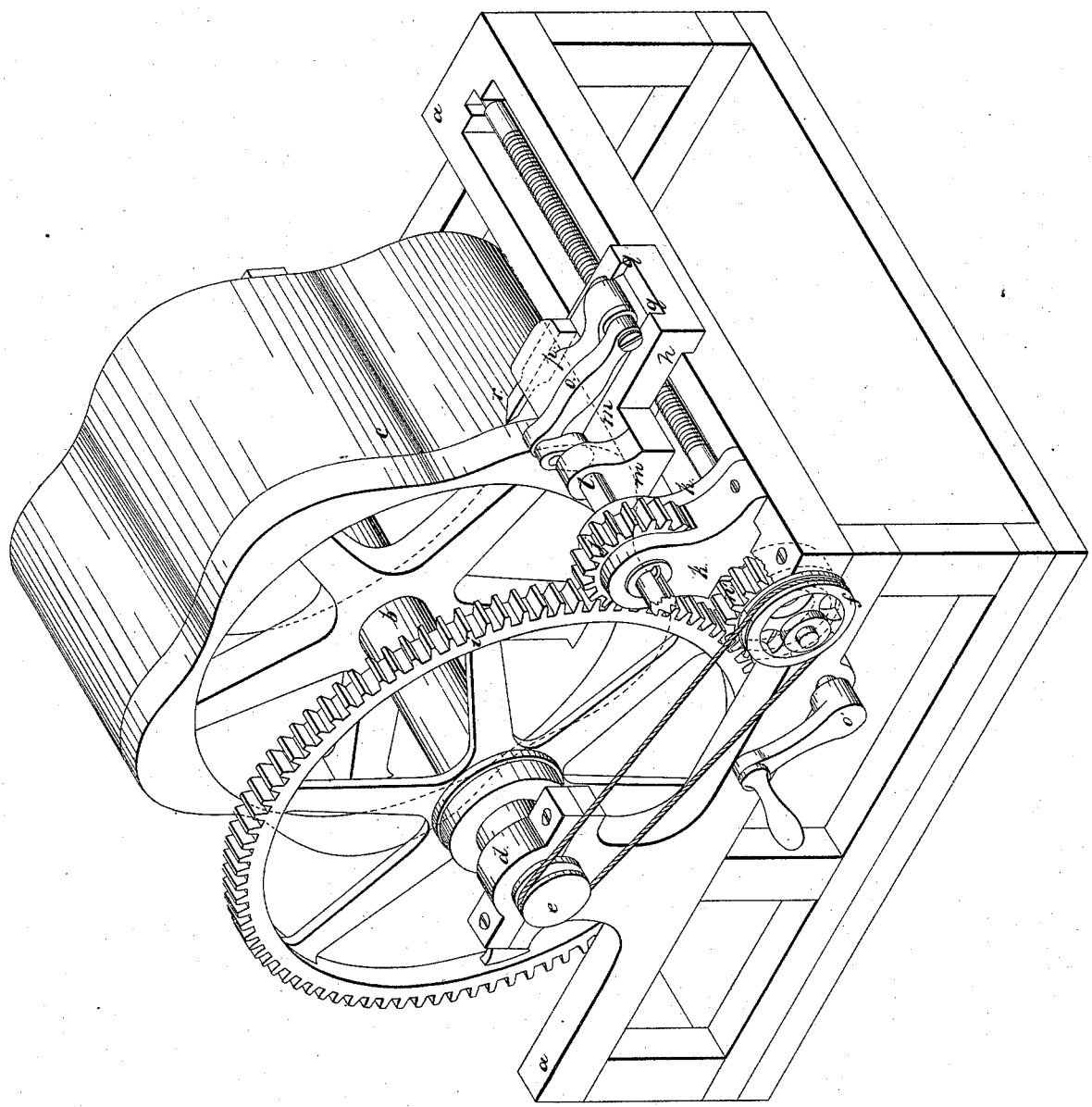

UNITED STATES PATENT OFFICE.

HENRY G. THOMPSON, OF NEW YORK, N. Y.

LATHE FOR TURNING A PECULIAR SPECIES OF CURVE.

Specification of Letters Patent No. 7,311, dated April 23, 1850.

*To all whom it may concern:*

Be it known that I, HENRY G. THOMPSON, of the city, county, and State of New York, have invented a new and useful improvement in the lathe for turning the piston-wheels of rotary steam-engines such as are described in Letters Patent granted to me and bearing date the ———— day of ————, A. D. 1849, the periphery of which is of a curve generated by the rotation of the steam-wheel and the in and out motion of the steam-stops, which improvement is applicable to the turning of other articles of the same class of figures, and that the following is a full, clear, and exact description of the principle or character of my improvement which distinguishes it from all other things before known and of the method of making, constructing, and using the same, reference being had to the accompanying drawing, making part of this specification, which represents an isometrical perspective view of the said improved lathe.

The nature of my invention consists in combining with the mandrel of the lathe, or the shaft of the steam wheel to be turned, a cutter stock which, in addition to the usual progressive motion in a line parallel with the axis of the mandrel or shaft, shall have a reciprocating motion toward and from the axis of the mandrel or shaft, to be communicated by a crank the shaft of which is rotated by a pinion having cogs which engage the cogs of a wheel on the mandrel or shaft.

In the accompanying drawing (*a*) represents the frame of a lathe which may be of any suitable construction adapted to the purpose and (*b*) the mandrel onto which is to be properly secured the steam wheel (*c*) that is to be turned. Instead of the mandrel (*b*) the shaft of the intended steam wheel may be substituted by having the frame properly adapted to receive its journals in boxes (*d*). On the said mandrel or shaft there is a pulley (*e*) from which a band passes to another pulley (*f*) on the arbor of a screw (*g*) which passes through a cutter carriage (*h*) or is properly tapped into a nut connected therewith to give a slow progressive motion to the said carriage in a line parallel with the axis of the mandrel or shaft in the usual manner of the well known engine lathes. On the said mandrel or shaft there is a cog-wheel (*i*) which engages the cogs of a pinion (*j*) which turns in standards (*k, k,*) on the frame and the eye of the said pinion is feathered onto a shaft (*l*) which slides freely through it and which has a collared journal near one end turning in a box in a standard (*m*) of the cutter carriage so that the said shaft may slide back and forth with the cutter carriage and at the same time be rotated by the pinion. Beyond the journal this shaft is provided with a crank (*n*) which, by a connecting rod (*o*) communicates a reciprocating motion to the cutter carrier (*p*) which slides between ways (*q*) on the top of the cutter carriage and at right angles to the motion thereof, so that by the rotation of the crank, the cutter carrier, with the cutter (*r*) secured to it, is made to traverse toward and from the axis of the mandrel or shaft of the steam wheel intended to be turned, as it (the cutter) is carried longitudinally from end to end of the said steam wheel, and in a line parallel with its axis, by means of the screw (*g*).

Motion is communicated to the mandrel or shaft of the steam wheel by means of a pinion (*n'*) which engages the cog-wheel (*i*) on the mandrel, the shaft of the said mandrel having a crank-handle (*o'*) or a pulley by which it is rotated.

From the foregoing it will be seen that if the pinion (*j*) be, as represented in the drawing, one fifth of the size of the cog-wheel, that the cutter will move toward and from the axis of the steam wheel during one revolution of the said steam wheel, and that therefore the periphery of the said wheel when turned off will have fine projections and depressions of a curved form generated by the rotation of the steam-wheel and the in and out motion of the cutter toward and from the axis; if, therefore, the throw of the crank which moves the cutter toward and from the axis of the mandrel or shaft be equal to the motion of the steam stop or stops in the intended steam engine and the number of rotations of said crank bears the same relation to the rotation of the mandrel or shaft as the steam stop or stops in the intended engine bear to the rotation of the steam wheel it will follow that the periphery of the said wheel will be turned in the lathe of such a figure, that in the operations of the engine, the edges of the steam stops will be always in contact with it.

It will be obvious from the foregoing that the number of projections and depressions on the periphery of the wheel to be turned, and the extent of their variations from a true circle may be varied at pleasure, by varying the proportion of the cog-wheel and pinion and the throw of the crank.

The mode of communicating the longitudinal motion to the cutter carriage and the rotary motion of the mandrel or shaft of the steam wheel may also be varied at pleasure as these make no part of my invention.

What I claim as my invention and desire to secure by Letters Patent is—

The method substantially as herein described of turning the periphery of steam wheel, or other articles with regularly curved projections and depressions from a true circle by combining with the mandrel of a lathe, or (what is equivalent thereto), the shaft of the steam-wheel, a cutter, which, in addition to the usual longitudinal motion parallel with the axis receives a reciprocating motion toward and from the axis by means of a cog wheel and pinion and crank, or their equivalent as herein described.

H. G. THOMPSON.

Witnesses:
 WM. BISHOP,
 CAUSA BROWNE.